United States Patent Office 3,806,559
Patented Apr. 23, 1974

---

3,806,559
O-PHENYLTHIONOETHANEPHOSPHONIC ACID ESTER AMIDES
Wolfgang Hofer, Wuppertal-Elberfeld, Ingeborg Hammann, Cologne, Bernhard Homeyer, Opladen, and Wilhelm Stendel, Wuppertal-Elberfeld, Germany, assignors to Bayer Aktiengesellschaft, Leverkusen, Germany
No Drawing. Filed Apr. 9, 1971, Ser. No. 132,875
Claims priority, application Germany, Apr. 23, 1970, P 20 19 597.5
Int. Cl. A01n 9/36; C07f 9/24
U.S. Cl. 260—941                            7 Claims

ABSTRACT OF THE DISCLOSURE

O-phenylthionoethanephosphonic acid ester amides of the formula

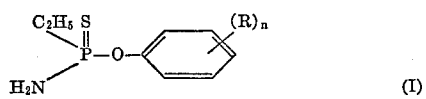

in which

R is a straight or branched-chain alkyl radical with 1 to 6 carbon atoms, a halogen atom and/or a nitro, alkylmercapto, alkoxy, acyl and/or carboalkoxy group, and
n is an integer from 0 to 5,
R may be the same or different which possess insecticidal, acaricidal, nematocidal and ectoparasiticidal properties.

---

The present invention relates to and has for its objects the provision of particular new O-phenylthionoethanephosphonic acid ester amides which possess insecticidal, acaricidal, nematocidal and ectoparasiticidal properties, active compositions in the form of mixtures of such compounds with solid and liquid dispersible carrier vehicles, and methods for producing such compounds and for using such compounds in a new way especially for combating pests, e.g., insects, acarids, nematodes and ectoparasites, with other and further objects becoming apparent from a study of the within specification and accompanying examples.

It is known from German published specification 1,142,605 that O-aryl-N,N-dialkylthionoalkanephosphonic acid ester amides, for example O-[4-chlorophenyl] or O-[2,4-dichlorophenyl] - N,N - dimethylthionoethanephosphonic acid ester amide, possess insecticidal and acaricidal properties. Furthermore it is known from U.S. patent specification 2,761,806 and German published specification 1,134,241 that O,O-dialkyl-O-dichlorophenyl thionophosphoric acid esters, for example O,O-diethyl-O-[2,4-dichlorophenyl]-thionophosphoric acid ester, are distinguished by a nematocidal and soil-insecticidal effectiveness.

The present invention provides, as new compounds, the O-phenylthionoethanephosphonic acid ester amides of the general formula

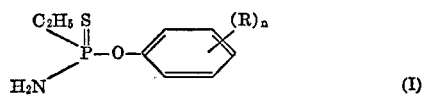

in which

R is a straight or branched-chain alkyl radical with 1 to 6 carbon atoms, a halogen atom and/or a nitro, alkylmercapto, alkoxy, acyl and/or carboalkoxy group and
n is an integer from 0 to 5, R may be the same or different.

The compounds of the Formula I have been found to exhibit strong insecticidal, acaricidal and nematocidal properties.

The present invention also provides a process for the preparation of a compound of the Formula I in which an O-phenylthionoethanephosphonic acid ester halide of the general formula

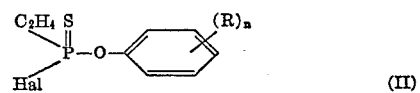

in which

Hal stands for a halogen, preferably a chlorine atom, and R, and n have the meanings stated above, is reacted with ammonia.

Surprisingly, the O-phenylthionoethanephosphonic acid ester amides according to the invention are distinguished by a considerably higher insecticidal, acaricidal and nematocidal activity than the known O-aryl-N,N-dialkylthionoalkanephosphonic acid ester amides and O,O-dialkyl-O-dichlorophenylthionophosphoric acid esters of analogous constitution and the same direction of activity. The compounds according to the invention therefore represent a genuine enrichment of the art.

If, for example, O-phenylthionoethanephosphonic acid ester chloride and ammonia are used as starting materials, the reaction course can be represented by the following formula scheme:

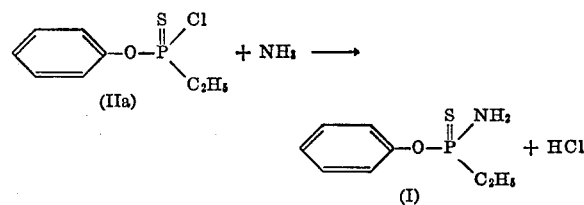

The starting materials to be used for the process are defined generally by the Formula II. However, in this formula and in Formula I in the preferred instances $n$ is O or R is preferably a straight or branched-chain lower alkyl radical with 1 to 4 carbon atoms, namely methyl, ethyl, n- or isopropyl or n-, iso-, sec.- or tert.-butyl, a chlorine atom, nitro, methylmercapto, acetyl or a carbalkoxy group wherein the alkoxy radical contains 1 to 4 carbon atoms; where $n$ is more than 1, the R's may be the same or different.

As examples of O-phenylthionoethanephosphonic acid ester halides to be used as starting materials, there are mentioned:

O-(pentachlorophenyl)-,
O-(2-chloro-4-methylphenyl)-,
O-(2-chloro-4-isopropylphenyl)-,
O-(2-chloro-4-ethylphenyl)-,
O-(3-tert-butyl-4-chlorophenyl)-,
O-(3-ethyl-4-chlorophenyl)-,
O-(3,5-diethyl-4-chlorophenyl)-,
O-(2-nitrophenyl)-,
O-(2-carboethoxyphenyl)-,
O-(2-carbomethoxyphenyl)-,
O-(4-carbomethoxyphenyl)-,
O-(4-carboethoxyphenyl)-,
O-(2,5-dimethylphenyl)-,
O-(2-chloro-3-methylphenyl)-,
O-(3,5-dimethyl-4-chlorophenyl)-,
O-(4-ethylphenyl)-,
O-(4-methylphenyl)-,
O-(4-tert-butylphenyl)- and
O-(4-iso-propylphenyl)-thionoethanephosphonic acid ester halides.

The O-phenylthionoethanephosphonic acid ester halides of the Formula II to be used as starting materials can be prepared according to processes which are known in principle, for example from the reaction of thionoethanephosphonic acid dichloride, which has the formula

(III)

with phenols of the general formula

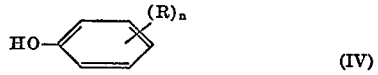
(IV)

in which R and $n$ have the meanings stated above, in the presence of acid acceptors, or with the appropriate alkali metal salts, alkaline earth metal salts or ammonium salts of the phenols of the Formula V.

The process is preferably carried out with the use of suitable solvents or diluents. As such, practically all inert organic solvents are suitable. These include, in particular, aliphatic and aromatic optionally chlorinated hydrocarbons, such as benzene, toluene, xylene, benzine, methylene chloride, chloroform, carbon tetrachloride and chlorobenzene; ethers, such as diethyl ether, dibutyl ether and dioxane; ketones, for example acetone, methylethyl, methylisopropyl and methylisobutyl ketones; and nitriles, such as acetonitrile. Water is another possible solvent.

The reaction temperature can be varied within a fairly wide range. In general, the work is carried out at from about 0° to 100° C. preferably at about 25° to 50° C.

The reaction is, in general, carried out at normal pressure.

When carrying out the process, the usual procedure is to provide the appropriate O - phenylthionoethanephosphonic acid ester chloride in a suitable solvent and to introduce ammonia at a temperature in the above range until saturation. It is, however, also possible to react directly with aqueous ammonia, without prior isolation, the O-phenylthionoethanephosphonic acid ester chlorides obtained from the thionoethanephosphonic acid dichloroide and the particular phenol. After stirring of the reaction mixture for one or more hours at the temperatures stated, the products may be worked up in customary manner.

The compounds according to the invention are, in most cases, obtained in the form of colorless to yellow-colored, viscous, water-insoluble oils which cannot be distilled without decomposition but which can, by so-called "slight distillation," i.e. prolonged heating to moderately elevated temperatures under reduced pressure, be freed from the last volatile components and in this way be purified. The refractive index serves, above all, for their characterization. Some of the compounds, however, are crystalline substances which can be characterized by their melting points.

As already mentioned, the new O-phenylthionoethanephosphonic acid ester amides are distinguished by an outstanding insecticidal, especially soil-insecticidal, acaricidal and nematocidal effectiveness in regard to plant pests, pests harmful to health and pests of stored products, as well as against fly larvae in the veterinary field. They possess a good activity against sucking as well as biting insects, and mites (Acarina). At the same time, they exhibit only a low phytotoxicity; they also possess an effectiveness against soil fungi and plant-pathogenic bacteria, for example xanthomonas oryzae.

For these reasons, the compounds according to the invention may be used with success as pesticides in crop protection and in the protection of stored products as well as in the hygiene and veterinary field.

To the sucking insects contemplated herein there belong, in the main, aphids (Aphidae) such as the green peach aphid (Myzus persicae), the bean aphid (Doralis fabae) the bird cherry aphid (Rhopalosiphum padi.), the pea aphid (Macrosiphum pisi) and the potato aphid (Macrosiphum solanifolii), the currant gall aphid (Cryptomyzus korschelti), the mealy apple aphid (Sappaphis mali), the mealy plum aphid (Hyalopterus arundinis) and the cherry black-fly (Myzus cerasi); in addition, scales and mealybugs (Coccina), for example the oleander scale (Aspidiotus hederae) and the soft scale (Lecanium hesperidum) as well as the grape mealybug (Pseudococcus maritimus); thrips (Thysanoptera), such as Hercinothrips femoralis, and bugs, for example the beet bug (Piesma quadrata), the cotton bug (Dysdercus intermedius), the bed bug (Cimex lectularius), the assassin bug (Rhodnium prolixus) and Chagas' bug (Triatoma infestans) and, further cicadas, such as Euscelis bilobatus and Nephotettix bipunctatus; and the like.

In the case of the biting insects contemplated herein, above all there should be mentioned butterfly caterpillars (Lepidoptera) such as the diamond-back moth (Plutella maculipennis), the gipsy moth (Lymantria dispar), the brown-tail moth (Euproctis chrysorrhoea) and tent caterpillar (Malacosoma neustria); further, the cabbage moth (Mamestra brassicae) and the cutworm (Agrotis segetum), the large white butterfly (Pieris brassicae), the small winter moth (Cheimatobia brumata), the green oak tortrix moth (Tortrix viridana), the fall armyworm (Laphygma frugiperda) and cotton worm (Prodenia litura), the ermine moth (Hyponomeuta padella), the Mediterranean flour moth (Ephestia kühniella) and greater wax moth (Galleria mellonella); and the like.

Also to be classed with the bitting insects contemplated herein are beetles (Coleoptera), for example the granary weevil (Sitophilus granarius-Calandra granaria), the Colorado beetle (Leptinotarsa decemlineata), the dock beetle (Gastrophysa viridula), the mustard beetle (Phaedon cochleariae), the blossom beetle (Meligethes aeneus), the raspberry beetle (Byturus tometosus), the bean weevil (Brunchidius-Acanthoscelides obtectus), the leather beetle (Dermestes frischi), the khapra beetle (Trogoderma granarium), the flour beetle (Tribolium casta-neum), the northern corn billbug (Calandra or Sitophilus zeamais), the drugstore beetle (Stegobium paneceum), the yellow mealworm (Tenebrio molitor) and the sawtoothed grain beetle (Oryzaephilus surinamensis), and also species living in the soil, for example wireworms (Agriotes spec.) and larvae of the cockchafer (Melolontha); cockroaches, such as the German cockroach (Blattella germanica), American cockroach (Periplaneta americana), Madera cockroach (Leucophaea or Rhyparobia maderae), Oriental cockroach (Blatta orientalis), the giant cockroach (Blaberus giganteus) and the black giant cockroach (Blaberus fuscus) as well as Henschoutedenia flexivitta; further, Orthoptera, for example the house cricket (Acheta domesticus); termites such as the easters subterranean termite (Reticulitermes flavipes) and Hymenoptera such as ants, for example the garden ant (Lasius niger); and the like.

The Diptera contemplated herein comprise essentially the flies, such as the vinegar fly (Drosophila melanogaster), the Mediterranean fruit fly (Ceratitis capitata), the house fly (Musca domestica), the little house (Fannia canicularis), the black blow fly (Phormia aegina) and bluebottle fly (Calliphora erythrocephala) as well as the stable fly (Stomoxys calcitrans); further, gnats, for example mosquitoes such as the yellow fever mosquito (Aedes aegypti), the northern house mosquito (Culex pipiens) and the malaria mosquito (Anopheles stephensi); and the like.

With the mites (Acari) contemplated herein there are classed, in particular, the spider mites (Tetranychidae) such as the two spotted spider mite (Tetranychus telarius-Tetranychus althaea or Tetranychus urticae) and the European red mite (Paratetranychus pilosus-Panonychus ulmi), blister mites, for example the currant blister mite (Eriophyes ribis) and tarsonemids, for example the broad mite (Hemitarsonemus latus) and the cyclamen mite (*Tarsonemus pallidus*); finally ticks, such as the relapsing fever tick (*Ornithordorus moubata*); and the like.

In the veterinary medical field, the products according to the invention act against animal ectoparasites, such as insects.

As ectoparasites from the class of the insects, there are mentioned for example: Diptera larvae, such as Lucilia sericata, Lucilia cuprina and Chrysomyia chlorophyga, parasitizing on warm-blooded animals.

When applied against pests harmful to health and pests of stored products, particularly flies and mosquitoes, the present compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, supsensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benbene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols, (e.g. glycol monomethyl ethers, etc.), amides (e.g. dimethyl foramide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, clays, alumina, silica, chalk, i.e. calcium carbonate, talc, attapulgite, montomorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection or ectoparasiticidal agents, such as other acaricides, insecticides, nematocides, ectoparasiticides, or rodenticides, fungicides, herbicides, bactericides, fertilizers, growth-regulating agents, etc., if desired, or in the form of particular dosage preparations for specific application made therefrom, such as solutions, emulsions, suspensions, powder, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10% preferably 0.01–1%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95% by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. insects, acarids nematodes and ectoparasites, and more particularly methods of combating at least one of insects, acarids, nematodes and ectoparasites, which comprises applying to at least one of correspondingly (a) such insects, (b) such acarids, (c) such nematodes, (d) such ectoparasites, and (e) the corresponding habitat thereof, i.e. the locus to be protected, a correspondingly combative or toxic amount, i.e. an insecticidally, acaricidally, nematocidally or ectoparasiticidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Phaedon larvae test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard bettle larvae (*Phaedon cochleariae*).

After the specified periods of time, the degree of destruction is determined as a percentage: 100% means that all the bettle larvae are killed. 0% means that none of the bettle larvae are killed.

The active compounds, the concentration of the active compound, the times of evaluation and the results can be seen from the following Table 1:

TABLE 1
Phaedon larvae test

| | Active compound (constitution) | Concentration of active compound in percent | Degree of destruction in percent after 3 days |
|---|---|---|---|
| (A) | $C_2H_5\text{-}P(=S)(N(CH_3)_2)\text{-}O\text{-}C_6H_4\text{-}Cl$ (known) | 0.1 / 0.01 | 80 / 0 |
| (B) | $C_2H_5\text{-}P(=S)(N(CH_3)_2)\text{-}O\text{-}C_6H_3(Cl)_2$ (known) | 0.1 / 0.01 | 100 / 0 |
| (C) | $C_2H_5\text{-}P(=S)(N(CH_3)_2)\text{-}O\text{-}C_6H_3(Cl)(C(CH_3)_3)$ (known) | 0.1 / 0.01 | 100 / 0 |
| (D) | $C_2H_5\text{-}P(=S)(N(CH_3)_2)\text{-}O\text{-}C_6H_3(CH_3)(SCH_3)$ (known) | 0.1 / 0.01 | 100 / 0 |
| (1) | $C_2H_5\text{-}P(=S)(NH_2)\text{-}O\text{-}C_6H_5$ | 0.1 / 0.01 | 100 / 40 |
| (2) | $C_2H_5\text{-}P(=S)(NH_2)\text{-}O\text{-}C_6H_4\text{-}NO_2$ | 0.1 / 0.01 | 100 / 100 |
| (3) | $C_2H_5\text{-}P(=S)(NH_2)\text{-}O\text{-}C_6H_4\text{-}NO_2$ | 0.1 / 0.01 | 100 / 95 |
| (4) | $C_2H_5\text{-}P(=S)(NH_2)\text{-}O\text{-}C_6H_3(Cl)(NO_2)$ | 0.1 / 0.01 | 100 / 90 |
| (5) | $C_2H_5\text{-}P(=S)(NH_2)\text{-}O\text{-}C_6H_4\text{-}Cl$ | 0.1 / 0.01 | 100 / 100 |
| (6) | $C_2H_5\text{-}P(=S)(NH_2)\text{-}O\text{-}C_6H_4\text{-}Cl$ | 0.1 / 0.01 | 100 / 90 |
| (7) | $C_2H_5\text{-}P(=S)(NH_2)\text{-}O\text{-}C_6H_5$ | 0.1 / 0.01 | 100 / 100 |
| (8) | $C_2H_5\text{-}P(=S)(NH_2)\text{-}O\text{-}C_6H_3(Cl)_2$ | 0.1 / 0.01 | 100 / 100 |
| (9) | $C_2H_5\text{-}P(=S)(NH_2)\text{-}O\text{-}C_6H_3(Cl)_2$ | 0.1 / 0.01 | 100 / 100 |

TABLE 1—Continued

| Active compound (constitution) | Concentration of active compound in percent | Degree of destruction in percent after 3 days |
|---|---|---|
| (10) $C_2H_5$–P(=S)(NH$_2$)–O–(2,4,5-trichlorophenyl) | 0.1<br>0.01 | 100<br>100 |
| (11) $C_2H_5$–P(=S)(NH$_2$)–O–(2,3,4-trichlorophenyl) | 0.1<br>0.01 | 100<br>100 |
| (12) $C_2H_5$–P(=S)(NH$_2$)–O–(2-methyl-4-chlorophenyl) | 0.1<br>0.01 | 100<br>70 |
| (13) $C_2H_5$–P(=S)(NH$_2$)–O–(2-chloro-4-methylphenyl) | 0.1<br>0.01 | 100<br>95 |
| (14) $C_2H_5$–P(=S)(NH$_2$)–O–(2-methyl-4-methylthiophenyl) | 0.1<br>0.01<br>0.001 | 100<br>100<br>90 |
| (15) $C_2H_5$–P(=S)(NH$_2$)–O–(2-chloro-4-tert-butylphenyl) | 0.1<br>0.01 | 100<br>100 |
| (16) $C_2H_5$–P(=S)(NH$_2$)–O–(4-acetylphenyl) | 0.1<br>0.01 | 100<br>80 |
| (17) $C_2H_5$–P(=S)(NH$_2$)–O–(2-ethoxycarbonylphenyl) | 0.1<br>0.01<br>0.001 | 100<br>100<br>90 |

EXAMPLE 2

Myzus test (contact action)

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 2:

TABLE 2
(Myzus test)

| Active compound (constitution) | Concentration of active compound in percent | Degree of destruction in percent after 24 hours |
|---|---|---|
| (A) $C_2H_5$–P(=S)(N(CH$_3$)$_2$)–O–(4-chlorophenyl) (known) | 0.1 | 0 |
| (B) $C_2H_5$–P(=S)(N(CH$_3$)$_2$)–O–(2,4-dichlorophenyl) (known) | 0.1 | 0 |

TABLE 2—Continued
| Active compound (constitution) | Concentration of active compound in percent | Degree of destruction in percent after 24 hours |
|---|---|---|
| (C) 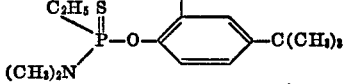 (known) | 0.1 | 0 |
| (D) 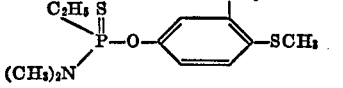 (known) | 0.1<br>0.01 | 40<br>0 |
| (2) 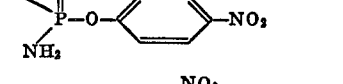 | 0.1<br>0.01 | 100<br>90 |
| (3) 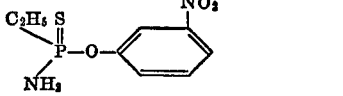 | 0.1<br>0.01 | 100<br>99 |
| (4) 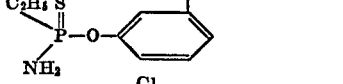 | 0.1<br>0.01 | 100<br>98 |
| (5) 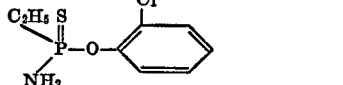 | 0.1<br>0.01 | 100<br>95 |
| (6) 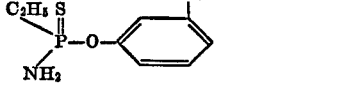 | 0.1<br>0.01 | 100<br>45 |
| (7) 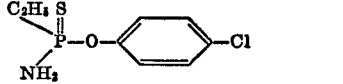 | 0.1<br>0.01 | 99<br>90 |
| (8) 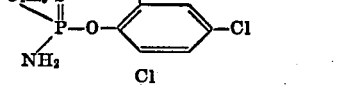 | 0.1<br>0.01 | 98<br>90 |
| (9) 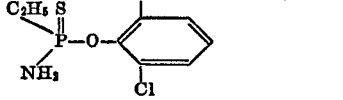 | 0.1<br>0.01<br>0.001 | 100<br>90<br>50 |
| (10) 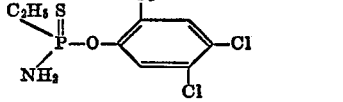 | 0.1<br>0.01 | 99<br>95 |
| (11) 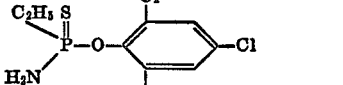 | 0.1<br>0.01<br>0.001 | 100<br>99<br>50 |
| (13) 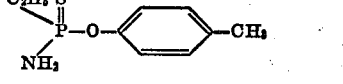 | 0.1 | 98 |
| (14) 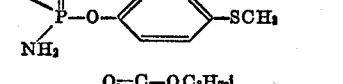 | 0.1<br>0.01<br>0.001 | 100<br>100<br>90 |
| (17) 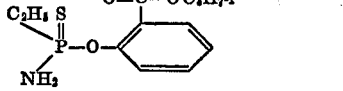 | 0.1<br>0.01<br>0.001 | 100<br>100<br>90 |

EXAMPLE 3

Tetranychus test

Solvent: 3 parts by weight actone
Emulsifier: 1 part by weight alkylaryl polyglycol ether To produce a suitable preparation of active compound, 1 part by weight of the active compound is mixed with the stated amount of solvent containing the stated amount of emulsifier and concentrate so obtained is diluted with water to the desired concentration Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3:

EXAMPLE 4

Critical concentration test

Test nematode: *Meloidogyne incognita*
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration.

The preparation of active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature of 27° C. After 4 weeks, the lettuce roots are examined for infestation which nematodes, and the degree of effectiveness of the active compound is determined as a percentage. The degree of effectiveness is 100° when infestation is completely avoided: it is 0% when the infestation is exactly the same as in the case of the control plants is untreated soil which has been infested in the same manner.

TABLE 3
(Tetranychus test)

| Active compound (constitution) | Concentration of active compound in percent | Degree of destruction in percent after 2 days |
|---|---|---|
| (D) 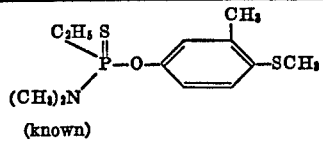 (known) | 0.1 | 30 |
| (1) 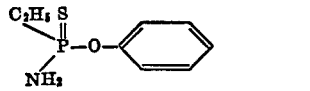 | 0.1 | 95 |
| (2) 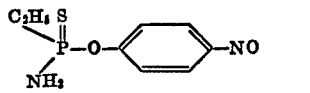 | 0.1 | 85 |
| (5) 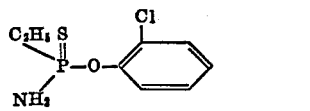 | 0.1 | 95 |
| (6) 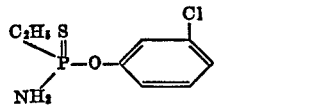 | 0.1 | 99 |
| (7) 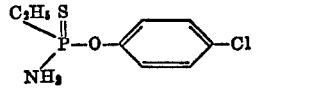 | 0.1 | 98 |
| (11) 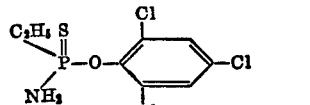 | 0.1 | 90 |
| (13) 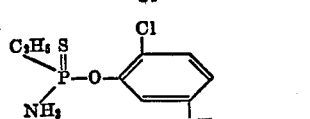 | 0.1 | 99 |
| (17) 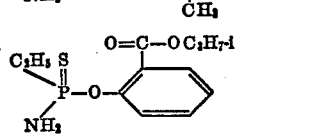 | 0.1 | 100 |

The active compounds, the amounts applied and the results can be seen from the following Table 4:

The preparation of active compound is intimately mixed with the soil. The concentration of the active com-

TABLE 4
Critical concentration test/Meloidogyne incognita

| Active compound (constitution) | Degree of destruction in percent with a concentration of— | | | |
|---|---|---|---|---|
| | 50 p.p.m. | 40 p.p.m. | 20 p.p.m. | 10 p.p.m. |
| (known) $(C_2H_5O)_2P(S)-O-C_6H_3Cl_2$ | | 98 | 80 | 50 |
| (1) $C_2H_5-P(S)(NH_2)-O-C_6H_5$ | | 100 | 99 | 98 |
| (14) $C_2H_5-P(S)(NH_2)-O-C_6H_3(CH_3)(SCH_3)$ | | 98 | | |
| (17) $C_2H_5-P(S)(NH_2)-O-C_6H_4(O=C-OC_4H_7\text{-}i)$ | | 25 | | |
| (6) $C_2H_5-P(S)(NH_2)-O-C_6H_4Cl$ | | 98 | 96 | 45 |
| (3) $C_2H_5-P(S)(NH_2)-O-C_6H_4NO_2$ | 99 | | | |
| (12) $C_2H_5-P(S)(NH_2)-O-C_6H_3(CH_3)(Cl)$ | | 98 | 97 | 75 |
| (18) $C_2H_5-P(S)(NH_2)-O-C_6H_2(CH_3)_2(Cl)$ | | 90 | 50 | |
| (19) $C_2H_5-P(S)(NH_2)-O-C_6H_4CH_3$ | | 100 | 100 | 98 |

EXAMPLE 5

Critical concentration test/soil insects

Test insect: Cabbage fly maggot (*Phorbia brassicae*)
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration.

pound in the preparation is of practically no importance; only the amount of active compound per unit volume of soil, which is given in p.p.m. for example mg./l., is decisive. The soil is filled into pots and the pots are left to stand at room temperature. After 24 hours, the test animals are put into the treated soil, and after a further 48 hours the degree of effectiveness of the active compound is determined as a percentage by counting the dead and living test insects. The degree of effectiveness is 100% when all the test insects have been killed; it is 0% when exactly as many test insects are alive as in the case of the control.

The active compounds, the amounts applied and the results can be seen from the following Table 5:

TABLE 5
Critical concentration test/soil insects (*Phorbia brassicae*)

| Active compound (constitution) | Degree of destruction in percent with a concentration of active compound of— | | |
|---|---|---|---|
| | 20 p.p.m. | 10 p.p.m. | 5 p.p.m. |
| (5) $C_2H_5$—P(=S)(NH_2)—O—C_6H_4—Cl | 100 | 95 | 50 |
| (7) $C_2H_5$—P(=S)(NH_2)—O—C_6H_4—Cl | 100 | 100 | 95 |
| (17) $C_2H_5$—P(=S)(NH_2)—O—C_6H_4—C(=O)—OC_3H_7 | 100 | 90 | 25 |
| (6) $C_2H_5$—P(=S)(NH_2)—O—C_6H_4—Cl | 100 | 100 | 100 |
| (4) $C_2H_5$—P(=S)(NH_2)—O—C_6H_3(Cl)—NO_2 | 100 | 95 | 50 |
| (8) $C_2H_5$—P(=S)(NH_2)—O—C_6H_3(Cl)—Cl | 100 | 75 | 50 |
| (E) $(C_2H_5O)_2$P(=S)—O—C_6H_3(Cl)—Cl (known) | 80 | 25 | 0 |

EXAMPLE 6

Test with parasitizing fly larvae

Solvent: 35 parts by weight ethyleneglycolmonomethyl ether, 35 parts by weight nonylphenolpolyglycol ether To produce a suitable preparation of active compound, 30 parts by weight of the particular active substance are mixed with the stated amount of solvent which contains the above-mentioned proportion of emulsifier, and the concentrate so obtained is diluted with water to the desired concentration.

About 20 fly larvae (*Lucilia cuprina*) are put into a test-tube which contains about 1 cc. of horse musculature. 0.5 ml. of the preparation of active compound is applied to this horse-flesh. After 24 hours, the degree of destruction is determined as a percentage. 100% denotes that all, 0% that no, larvae have been killed.

The active compounds tested, the concentrations applied and the test results obtained can be seen from the following Table 6:

TABLE 6
Test with parasitizing fly larvae

| Active compound (constitution) | Concentration of active compound in percent | Degree of destruction in percent after 24 hours |
|---|---|---|
| (1) $C_2H_5$—P(=S)(NH_2)—O—C_6H_5 | 0.03 | 100 |
| | 0.01 | 100 |
| | 0.003 | <50 |
| (8) $C_2H_5$—P(=S)(NH_2)—O—C_6H_3(Cl)—Cl | 0.03 | 100 |
| | 0.01 | 100 |
| | 0.003 | 100 |
| | 0.001 | 100 |
| | 0.0003 | 0 |
| (5) $C_2H_5$—P(=S)(NH_2)—O—C_6H_4—Cl | 0.03 | 10 |
| | 0.003 | 100 |
| | 0.0003 | 0 |
| (13) $C_2H_5$—P(=S)(NH_2)—O—C_6H_3(Cl)—CH_3 | 0.03 | 100 |
| | 0.003 | <50 |
| | 0.0003 | 0 |
| (12) $C_2H_5$—P(=S)(NH_2)—O—C_6H_3(CH_3)—Cl | 0.03 | 100 |
| | 0.003 | <50 |
| | 0.0003 | 0 |
| (10) $C_2H_5$—P(=S)(NH_2)—O—C_6H_3(Cl)—Cl | 0.03 | 100 |
| | 0.01 | 100 |
| | 0.003 | 100 |
| | 0.001 | <50 |
| | 0.0003 | 0 |
| (15) $C_2H_5$—P(=S)(NH_2)—O—C_6H_3(Cl)—C(CH_3)_3 | 0.03 | 100 |
| | 0.01 | 100 |
| | 0.003 | 100 |
| | 0.001 | 100 |
| | 0.0003 | |
| | 0.0001 | <50 |
| | 0.00003 | 0 |

TABLE 6—Continued

| Active compound (constitution) | | Concentration of active compound in percent | Degree of destruction in percent after 24 hours |
|---|---|---|---|
| (7) | 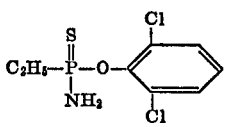 | 0.03<br>0.003<br>0.0003 | 100<br><50<br>0 |
| (14) | (structure with CH₃ and SCH₃) | 0.03<br>0.01<br>0.003<br>0.001<br>0.0003 | 100<br>100<br><50<br><50<br>0 |
| (17) | 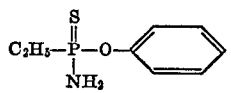 | 0.03<br>0.003<br>0.0003 | 100<br>100<br>0 |

The following further examples are set forth to illustrate, without limitation, the process for producing the active compounds according to the present invention.

EXAMPLE 7

(structure 9)

Until saturation, ammonia gas is introduced at 30° C. to 40° C., with stirring, into a solution of 87 g. (0.3 mole) of O-(2,6-dichlorophenyl)-thionoethanephosphonic acid ester chloride in 300 ml. of benzene, and the mixture is allowed to continue to react for 1 hour. It is then washed with water and, after drying, the solvent is drawn off under reduced pressure. By recrystallization from light petroleum, 24 g. (30% of theory) of O-(2,6-dichlorophenyl)-thionoethanephosphonic acid ester amide are obtained in the form of white crystals of the melting point 76° C.

*Analysis.*—$C_8H_{10}Cl_2NOPS$ (molecular weight 270). Calc.: N, 5.19%; S, 11.85%; Cl, 26.3%. Found: N, 5.10%; S, 11.91%; Cl, 26.13%.

EXAMPLE 8

(structure 1)

A solution of 94 g. (1 mole) of phenol and 44 g. (1.1 moles) of sodium hydroxide in 100 ml. of water is slowly added dropwise at 30° C., with stirring, to 160 g. (1 mole) of thionoethanephosphonic acid dichloride. The reaction proceeds exothermally, so that the mixture must be cooled. After completion of the dropwise addition, the mixture is stirred for a further 2 hours at room temperature, and 150 ml. (2.2 moles) of a 25% strength aqueous ammonia solution are then added dropwise at 30° C., with stirring and cooling, to the two-phase reaction mixture. After 2 hours stirring at room temperature, the organic phase is taken up in 300 ml. of methylene chloride, washed with a dilute solution of sodium hydroxide, then with water, the methylene chloride solution is dried over sodium sulfate, and the solvent is drawn off under reduced pressure. O-phenylthionoethanephosphonic acid ester amide remains behind in the form of white crystals of the melting point 60° C.

The yield is 148 g. (74% of theory).

*Analysis.*—$C_8H_{12}NOPS$ (molecular weight 201). Calc.: N, 6.96%; S, 15.9%. Found: N, 6.38%; S, 15.49%.

In a manner analogous with that described above, the following compounds can be prepared:

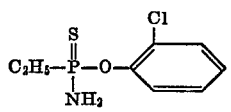

pale oil refractive index $n^{22}_D = 1.5885$, yield: 78% of theory.

*Analysis.*—$C_8H_{11}ClNOPS$ (molecular weight 235.5). Calc.: N, 5.95%; S, 13.6%. Found: N, 5.38%; S, 13.25%.

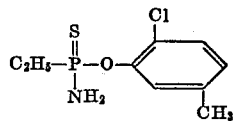

crystals (from ligroin) M.P. 72° C., yield: 63% of theory.

*Analysis.*—$C_9H_{13}ClNOPS$ (molecular weight 249.5). Calc.: N, 5.62%; S, 12.85%. Found: N, 5.68%; S, 13.06%.

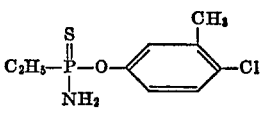

crystals (from ligroin) M.P. 87° C., yield 54% of theory.

*Analysis.*—$C_9H_{13}ClNOPS$ (molecular weight 249.5). Calc.: N, 5.63%; S, 12.85%. Found: N, 5.35%; S, 12.83%.

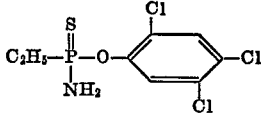

crystals (from light petroleum) M.P. 76° C., yield 56% of theory.

*Analysis.*—$C_8H_9Cl_3NOPS$ (molecular weight 304.5). Calc.: N, 4.59%; S, 10.5%. Found: N, 4.74%; S, 10.78%.

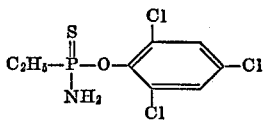

crystals (from ligroin) M.P. 78° C., yield: 76% of theory.

*Analysis.*—$C_8H_9NOPS$ (molecular weight 304.5). Calc.: N, 4.59%; S, 10.49%. Found: N, 4.72%; S, 10.59%.

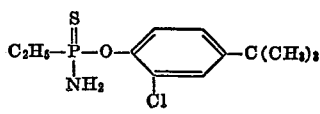

brown oil, refractive index $n^{22}_D = 1.5435$, yield: 69% of theory.

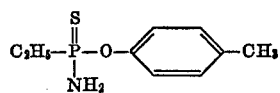 (19)

yellow oil, refractive index $n^{22}_D = 1.5720$, yield: 80% of theory.

*Analysis.*—$C_9H_{14}NOPS$ (molecular weight 215). Calc.: N, 6.54%; S, 14.95%. Found: N, 6.89%; S, 14.03%.

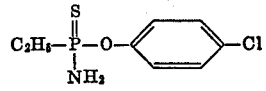 (7)

pale oil, refractive index $n^{22}_D = 1.5879$, yield: 81% of theory.

*Analysis.*—$C_8H_{11}ClNOPS$ (molecular weight 235.5). Calc.: N, 5.95%; S, 13.6%. Found: N, 5.30%; S, 13.56%.

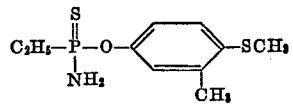 (14)

white crystals (from ligroin) M.P. 78° C., yield: 60% of theory.

*Analysis.*—$C_{10}H_{16}NOPS_2$ (molecular weight 261). Calc.: N, 5.36%; S, 24.5%. Found: N, 5.35%, S, 24.42%.

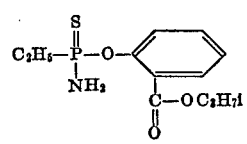 (17)

pale oil refractive index $n^{22}_D = 1.5445$, yield: 73% of theory.

*Analysis.*—$C_{12}H_{18}NO_3PS$ (molecular weight 287). Calc.: N, 4.87%; S, 11.15%. Found: N, 4.18%; S, 10.93%.

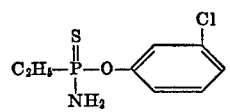 (6)

white crystals (from ligroin) M.P. 52° C., yield: 54% of theory.

*Analysis.*—$C_8H_{11}ClNOPS$ (molecular weight 235.5). Calc.: N, 5.95%; S, 13.6%. Found: N, 6.04%, S, 13.4%.

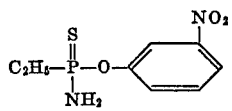 (4)

crystals (from ligroin) M.P. 72° C., yield: 70% of theory.

*Analysis.*—$C_8H_{11}N_2O_3PS$ (molecular weight 246). Calc.: N, 11.35%; S, 13.0%. Found: N, 11.04%; S, 12.96%.

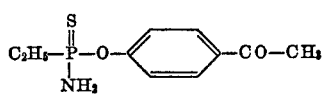 (16)

refractive index $n^{22}_D = 1.5929$.

*Analysis.*—$C_{10}H_{14}NO_2PS$ (molecular weight 243.5). Calc.: N, 5.76%; S, 13.18%. Found: N, 5.6%; S, 12.13%.

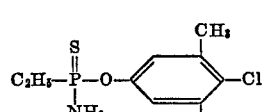 (18)

crystals (from light petroleum), M.P. 62° C., yield: 60% of theory.

*Analysis.*—$C_{10}H_{15}ClNOPS$ (molecular weight 263.5). Calc.: N, 5.32%; S, 12.15%. Found: N, 5.30%; S, 12.0%.

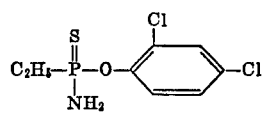 (8)

crystals (from ligroin), M.P. 66° C., yield: 49% of the theory.

*Analysis.*—$C_8H_{10}Cl_2NOPS$ molecular weight 270). Calc.: N, 5.19%; S, 11.85%. Found: N, 5.0%; S, 11.5%.

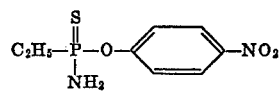 (2)

refractive index $n^{23}_D = 1.6051$, yield: 44% of the theory.

*Analysis.*—$C_8H_{11}N_2O_3PS$ (molecular weight 246). Calc.: S, 13.0%. Found: S, 12.22%.

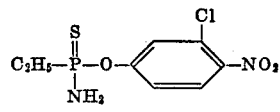 (4)

refractive index $n^{23}_D = 1.5996$, yield: 40% of the theory.

*Analysis.*—$C_8H_{10}ClN_2O_3PS$ (molecular weight 280.5). Calc.: N, 10.0%. Found: N, 9.81%.

It will be appreciated that the instant specification and examples are set forth by way of illustration and not limitation, and that various modifications and changes may be made without departing from the spirit and scope of the present invention.

What is claimed is:

1. O-phenylthionoethanephosphonic acid ester amides of the general formula

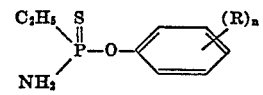 (I)

in which
each R independently is a straight or branched-chain radical with 1 to 4 carbon atoms, a chlorine atom, a nitro, methylmercapto, acetyl or carbalkoxy group of which the alkoxy moiety has 1 to 4 carbon atoms, and n is an integer from 0 to 5.

2. Compound according to claim 1 wherein such compound is O - (4 - chlorophenyl) - thionoethanephosphonic acid ester amide of the formula

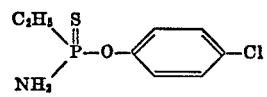 (7)

3. Compound according to claim 1 wherein such compound is O-(2,4-dichlorophenyl)-thionoethanephosphonic acid ester amide of the formula

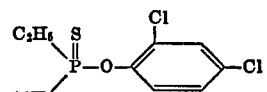 (8)

4. Compound according to claim 1 wherein such compound is O - (2,4,5 - trichlorophenyl)-thionoethanephosphonic acid ester amide of the formula

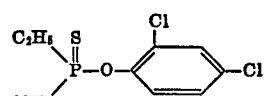 (10)

5. Compound according to claim 1 wherein such compound is O-(3-methyl-4-methylmercaptophenyl)-thionoethanephosphonic acid ester amide of the formula

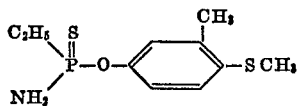

(14)

6. Compound according to claim 1 wherein such compound is O-(2-chloro-4-t-butylphenyl)-thionoethanephosphonic acid ester amide of the formula

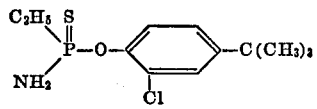

(15)

7. Compound according to claim 1 wherein such compound is O - (2 - carboisopropoxyphenyl) - thionoethanephosphonic acid ester amide of the formula

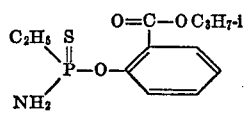

(17)

References Cited
UNITED STATES PATENTS
3,260,712  7/1966  Schrader _____ 260—959 XR FOREIGN PATENTS
179,317  2/1966  U.S.S.R. _____ 260—959
197,359  5/1967  U.S.S.R. _____ 260—959

ANTON H. SUTTO, Primary Examiner

U.S. Cl. X.R.

260—946, 949, 954, 959, 984; 424—212, 214, 216, 218, 220

UNITED STATES PATENT OFFICE
CERTIFICATE OF CORRECTION

Patent No. 3,806,559                    Dated April 23, 1974

Inventor(s) WOLFGANG HOFER ET AL.            (page 1 of 2)

It is certified that error appears in the above-identified patent and that said Letters Patent are hereby corrected as shown below:

Col. 5, line 39, change "benbene" to --benzene--.

Col. 5, line 46, change "foramide" to -- formamide--.

Col. 8, Table 1, compound (7), correct formula to read as follows

Col. 9, Table 1, compound (17), correct formula to read as follow

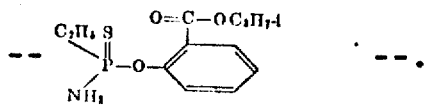

Col. 11, Table 2, compound (4), correct formula to read as follow

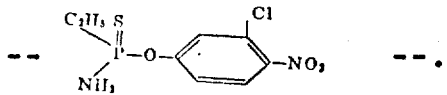

Col. 13, line 10, before "concentrate" insert -- the --.

Col. 13, Table 3, compound (2), correct formula to read as follow

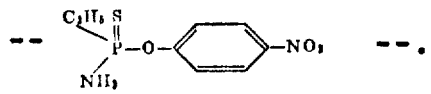

Col. 14, line 22, change "100°" to -- 100% --.

UNITED STATES PATENT OFFICE
CERTIFICATE OF CORRECTION

Patent No. 3,806,559           Dated _____

Inventor(s) _____ (page 2 of 2) _____

It is certified that error appears in the above-identified patent and that said Letters Patent are hereby corrected as shown below:

Col. 18, Table 6, last column of Table, compound (5), change "10" to -- 100 --;

Col. 18, Table 6, last column of Table, compound (15), above "<50", insert -- 100 --.

Col. 19, Table 6, compound (17), the formula should read as follows:

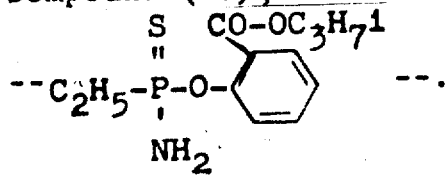

Col. 24, add the following claim:

-- 8. Compound according to claim 1 in which n is at least 1. --

Signed and sealed this 3rd day of December 1974.

(SEAL)
Attest:

McCOY M. GIBSON JR.
Attesting Officer

C. MARSHALL DANN
Commissioner of Patents